US009406467B2

(12) United States Patent
Avery

(10) Patent No.: US 9,406,467 B2
(45) Date of Patent: Aug. 2, 2016

(54) SWITCHED POWER DISTRIBUTION UNIT

(71) Applicant: Server Technology, Inc., Reno, NV (US)

(72) Inventor: William H. Avery, Reno, NV (US)

(73) Assignee: Server Technology, Inc., Reno, NV (US)

( * ) Notice: Subject to any disclaimer, the term of this patent is extended or adjusted under 35 U.S.C. 154(b) by 44 days.

(21) Appl. No.: 14/020,585

(22) Filed: Sep. 6, 2013

(65) Prior Publication Data

US 2015/0070808 A1 Mar. 12, 2015

(51) Int. Cl.

| | |
|---|---|
| ***H02H 3/08*** | (2006.01) |
| ***H02H 9/02*** | (2006.01) |
| ***H01H 47/00*** | (2006.01) |
| ***H01H 47/22*** | (2006.01) |
| ***H01H 51/30*** | (2006.01) |

(52) U.S. Cl.

CPC ............... *H01H 47/00* (2013.01); *H01H 47/22* (2013.01); *H01H 51/30* (2013.01)

(58) Field of Classification Search

CPC ................................. H02H 3/08; H02H 3/087

USPC ................................................ 361/160, 170

See application file for complete search history.

(56) References Cited

U.S. PATENT DOCUMENTS

| | | | | |
|---|---|---|---|---|
| 7,043,543 | B2 | 5/2006 | Ewing et al. | |
| 7,630,186 | B2 * | 12/2009 | Reynolds et al. | 361/93.1 |
| 8,321,163 | B2 | 11/2012 | Ewing et al. | |
| 8,494,661 | B2 | 7/2013 | Ewing et al. | |
| 2012/0032520 | A1 * | 2/2012 | Divan | 307/99 |
| 2013/0342950 | A1 * | 12/2013 | Westrick et al. | 361/170 |
| 2014/0268473 | A1 * | 9/2014 | Hassan-Ali et al. | 361/179 |

* cited by examiner

*Primary Examiner* — Dharti Patel

(74) *Attorney, Agent, or Firm* — Perkins Coie LLP

(57) ABSTRACT

Systems, methods, and apparatuses are provided in which power control relay switches may be configured to switch at or near a predetermined time during an AC cycle and/or that are configured to control a velocity of an armature of the relay switch during switching. An input power source may provide alternating current (AC) power and a voltage or current level of the AC power may be sensed. A relay controller may switch the relay switch based on a time at which the voltage or current is at or near a zero-crossing. The relay controller may be configured to close the relay switch based on when a voltage of the power input is at a zero-crossing, and is configured to open the relay switch based on when a current of the power input is at a zero-crossing.

32 Claims, 7 Drawing Sheets

SWITCHED POWER DISTRIBUTION UNIT

FIELD

The present disclosure is directed to power distribution apparatuses for distribution of power to electronic devices, and more specifically, to switching in a power distribution unit having switched receptacles.

BACKGROUND

A conventional Power Distribution Unit (PDU) is an assembly of electrical outlets (also called receptacles) that receive electrical power from a source and distribute the electrical power to one or more separate electronic appliances. Each such unit has one or more power cords plugged in to one or more of the outlets. PDUs also have power cords that can be directly hard wired to a power source or may use a traditional plug and receptacle connection. PDUs are used in many applications and settings such as, for example, in or on electronic equipment racks. One or more PDUs are commonly located in an equipment rack (or other cabinet), and may be installed together with other devices connected to the PDU such as environmental monitors, temperature and humidity sensors, fuse modules, or communications modules that may be external to or contained within the PDU housing. A PDU that is mountable in an equipment rack or cabinet may sometimes be referred to as a Cabinet PDU, or "CDU" for short.

A common use of PDUs is supplying operating power for electrical equipment in computing facilities, such as data centers or server farms. Such computing facilities may include electronic equipment racks that comprise rectangular or box-shaped housings sometimes referred to as a cabinet or a rack and associated components for mounting equipment, associated communications cables, and associated power distribution cables. Electronic equipment may be mounted in such racks so that the various electronic devices are aligned vertically one on top of the other in the rack. One or more PDUs may be used to provide power to the electronic equipment within each rack. Multiple racks may be oriented side-by-side, with each containing numerous electronic components and having substantial quantities of associated component wiring located both within and outside of the area occupied by the racks. Such racks commonly support equipment that is used in a computing network for an enterprise, referred to as an enterprise network.

As mentioned, many equipment racks may be located in a data center or server farm, each rack having one or more associated PDUs. One or more such data centers may serve as data communication hubs for an enterprise. Many PDUs include network connections that provide for remote control and/or monitoring of the PDUs, and may include the ability to report information related to the PDU to a user or system located remotely from the PDU. A PDU may include power control relays that may be actuated by a remote user to interrupt power to one or more of the outputs of a PDU. Such relays may have a turn on and turn off delay and in addition have natural resonances in a relay armature and armature contacts that often cause the contacts to bounce for some amount of time, typically being some number of ms. During these bounces the contacts move away from each other. In the event that current is flowing through the contacts, an arc may develop. In some examples, an arc may develop that is on the order of 35 volts, depending on the temperature and pressure. The power dissipated during the arcing causes heating of the contacts, and metal may be sputtered off of contact surfaces, which may shorten the life of the contacts. Such power control relays may be a point of failure of a PDU, which may in some cases reduce the useful lifetime of a PDU. Reliable switching operation of relays for relatively long lifetimes may thus be desirable, particularly in many data center operations. Such a relay failure in a data center may result in the loss of one or more pieces of critical equipment for an organization or enterprise, causing a potentially costly disruption in service.

Some prior solutions to this issue have attempted to perform switching of relays to reduce arcing between contacts by switching relays when a voltage and/or current of the input power waveform is less than a maximum current and/or voltage. Such solutions may reduce the amount of arcing, but such arcing may continue to occur and potentially degrade the associated relay. Accordingly, improved switching for relays may be desirable to improve relay reliability.

SUMMARY

Methods, systems, and devices for switching of power distribution units are described. A power distribution unit may be provided with power control relay switches that are configured to switch at or near a predetermined time during an AC cycle and/or that are configured to control a velocity of an armature of the relay switch during switching.

According to a set of embodiments, a power control relay apparatus is provided that includes a relay housing with a power input, a control input, a power output, and a relay switch. The relay switch may be coupled with the power input, control input, and power output and configured to interrupt power from the power input to the power output responsive to the control input. A sensor may be coupled with the power input and configured to output a signal representative of a sensed parameter of an input power source. The apparatus may also include a relay controller coupled with the control input and the sensor, and configured generate a sequence of on and off pulses to the control input for relay switching based on the sensed parameter or a velocity of an armature of the relay switch during switching.

For example, the input power source may provide alternating current (AC) power and the sensed parameter may be a voltage or current level of the AC power, and the relay controller may switch the relay switch based on a time at which the voltage or current is at or near a zero-crossing. In some examples, the relay controller is configured to close the relay switch based on when a voltage of the power input is at a zero-crossing, and is configured to open the relay switch based on when a current of the power input is at a zero-crossing.

In some embodiments, the relay switch may include an armature and a spring coupled with the armature configured to hold the armature in an open position when the relay switch is open. The relay controller may act to switch the relay switch based on the sensed parameter and a biasing force provided by the spring. Two or more relay switches, for example, may each having a different biasing force, and the apparatus may also include a memory that stores a compensating variable for each of the relay switches, and the relay controller may switch each respective relay switch based on the sensed parameter and associated compensating variable. In some embodiments, the relay controller may apply a switching voltage to the relay switch for a first time period, remove the switching voltage for a second time period, and apply the switching voltage for a third time period. The first time period, for example, may correspond to a subset of the time period required for switching of the relay switch, and the second time period may correspond to a time period immediately preceding contact of a relay contact with an armature contact, thus reducing the velocity of the armature when it contacts the relay contact. Such reduction in velocity may reduce bouncing of the armature contact on the relay contact, and may also reduce arcing between the contacts during such bouncing. Such operation may, for example, increase the useful life of the relay switch and also provide smoother power transition at an output of the relay switch. In other embodiments, a power distribution apparatus is provided that includes one or more relay switches such as described above. In other embodiments, a method for switching a relay in a PDU is provided.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label.

DETAILED DESCRIPTION

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

The following patents and patent applications are incorporated herein by reference in their entirety: U.S. Pat. No. 7,043,543, entitled "Vertical-Mount Electrical Power Distribution Plugstrip," issued on May 9, 2006; U.S. patent application Ser. No. 12/344,419, entitled "Power Distribution, Management, and Monitoring Systems," and filed on Dec. 26, 2008; and U.S. patent application Ser. No. 12/717,879, entitled "Monitoring Power-Related Parameters in a Power Distribution Unit," and filed on Mar. 4, 2010.

Figure 1:
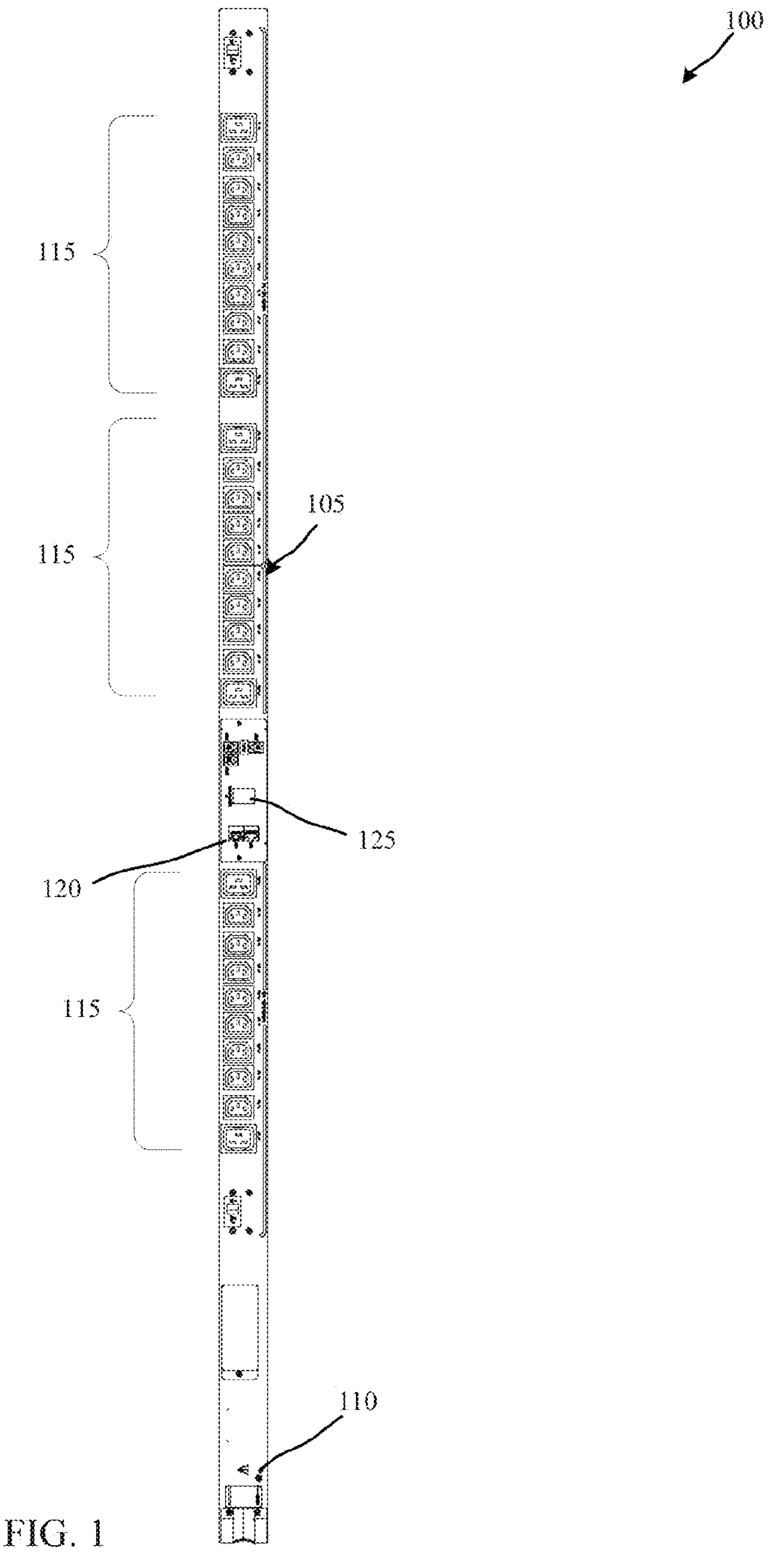
FIG. 1 illustrates a power distribution unit having a one or more relay switches in accordance with various embodiments.

With reference now to FIG. 1, an illustration of an exemplary system of an embodiment is now described. A PDU 100 is illustrated that may supply power to one or more associated electronic appliances. The PDU may have a housing 105 that allows the PDU to be mounted in an equipment rack. In the embodiment of FIG. 1, a PDU 100 is illustrated that may be mounted in an equipment rack in a vertical orientation. In other embodiments, PDUs may be provided that allow for mounting in a horizontal orientation, or either a vertical or horizontal orientation. Furthermore, a PDU, such as the PDU 100 illustrated in FIG. 1, may receive AC power through single or multiple phase power input 110. The PDU 100 may have a number of power outputs 115, which in this embodiment are arranged in three separate banks of power outputs 115. The PDU 100 is useable in a computer network, and may communicate over the computer network with a communications module, such as a network interface card or other suitable network communication device. The communications module may include one or more network interfaces 120 that may be used for communication with one or more data networks. Communications may include information related to switching of one or more relay switches located in the PDU, as will be discussed in more detail below, and may also include information related to one or more operating parameters of the PDU, such as current or voltage levels, power levels, energy consumption, etc. In the embodiment of FIG. 1, a local display 125 may also display one or more of such parameters locally at the PDU 100. As will be readily understood, PDUs may be installed in equipment racks of a data center, in which multiple rows of equipment racks may have numerous different PDUs located within, in some cases, several feet of one another.

Figure 2:
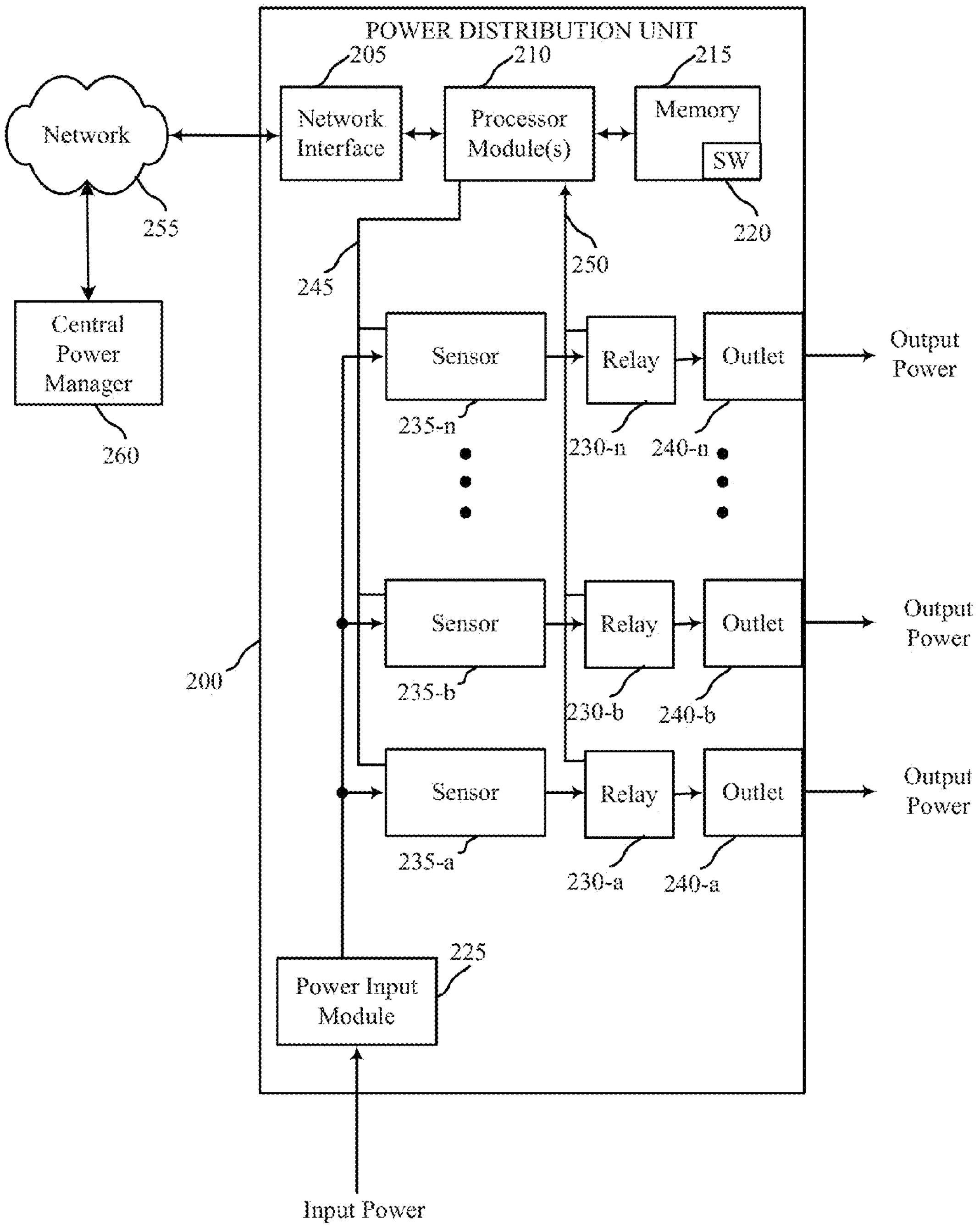
FIG. 2 is a block diagram illustration of a power distribution unit and various components therein in accordance with various embodiments.

With reference now to FIG. 2, a block diagram of an exemplary system of an embodiment is now described. A PDU 200 supplies power to one or more associated electronic appliances. PDU 200 may have a housing, such as discussed above, that allows the PDU to be mounted in an equipment rack in either a vertical or horizontal orientation. The PDU 200 is useable in a computer network, and may communicate over the computer network 255 through a network interface 205. The PDU 200 of this embodiment includes one or more processor module(s) 210, and a memory 215 that includes software 220 that, when executed by processor module(s) 210, cause the processor module(s) 210 to perform various operations related to functions of the PDU 200 and switching for one or more relay modules 230-*a*-230-*n*. A power input module 225 receives input power and distributes the power to multiple relay modules 230. In some embodiments, power input module 225 may include one or more sensors that may sense one or more parameters related to the input power, such as current, voltage, and/or some other power-related parameter, which may be provided to processor module(s) 210.

Relay modules 230 of various embodiments include relay switches that may be controlled by processor module(s) 210 to switch at particular desired times and/or are switches so as to reduce a velocity at which an armature in a relay switch contacts a relay contact, as will be described in more detail below. The PDU 100 also includes sensors 235 that may sense one or more parameters related to the power provided through the relay modules 230, such as current, voltage, and/or some other power-related parameter. While not illustrated in the block diagram of FIG. 2, one or more sensors may also be coupled with the power input module 225 that may sense one or more parameters related to the power provided through the power input module 225, such as current, voltage, and/or some other power-related parameter. Outlets 240 are coupled with respective relay modules 230, and provide output power to electronic appliances that receive power from PDU 200. While various embodiments describe PDUs for use in equipment racks and associated relay modules that may be switched at desired points in an AC cycle and/or that may switch with reduced armature velocity, it will be understood that various embodiments may be implemented in other applications and systems. For example, relay modules may be used in numerous other applications that may use a traditional relay to provide or interrupt power to a power output.

Communications with a network 255 and remotely located equipment, such as a remotely located power manager application 260 may be conducted through network interface 205, which may include a communications module such as a network interface card (NIC). A central power manager 260 may reside, for example, in a workstation or other device that is used in the management of a data center or other enterprise management, and issues network commands over a network communications connection to PDU 200, and one or more other PDUs, for example. The network interface 205 may include application firmware and hardware that allows the PDU 100 communicate with various remote systems or computers. In some embodiments, the PDU 200 includes a plurality of power outlets 240 arranged within an intelligent power module (IPM), in which case an IPM may include a processor that performs one or more functions of the PDU for the associated power outlets. Relay modules 230 control the application of power from the input power module 225 to a corresponding power outlet 240, and may be in communication with the processor module(s) 210 through relay control lines 245.

Processor module(s) 210, under the direction of a network power manager 260 or through local control, may control relay modules 230 to provide power and power cycling on-off for one or more of the corresponding power outlets 240. Processor module(s) 210 may receive sense signals from sensors 235 through one or more sense lines 250. Processor module(s) 210 may also be connected to other sensing components, such as input and/or output voltage sensing devices, input current sensing devices, environmental sensors (e.g., temperature and humidity devices), etc. The processor module(s) 210 may use this information to determine the power supplied through an outlet, aggregate power supplied by the PDU 200, current usage of one or more outlets 240, voltage of the power input and/or one or more outlets, and the like, with such information provided through the network interface 205 to a central power manager 260 and/or to a local display. Such a local display, in some embodiments, may also include a display, for example a single-digit or multi-digit LED display, to provide a visual indication of voltage, current or another power metric locally at the PDU. In some embodiments, the input power may be polyphase input power, and the input power module 225 may be a polyphase module such as a three phase delta or wye configured input. In such polyphase embodiments, different groups of outlets 240 may be coupled with different power phases, and may include a display that displays power metrics for two or more of the phases simultaneously through different portions of the display or through physically separate displays that are associated with a particular power phase.

Figure 3:
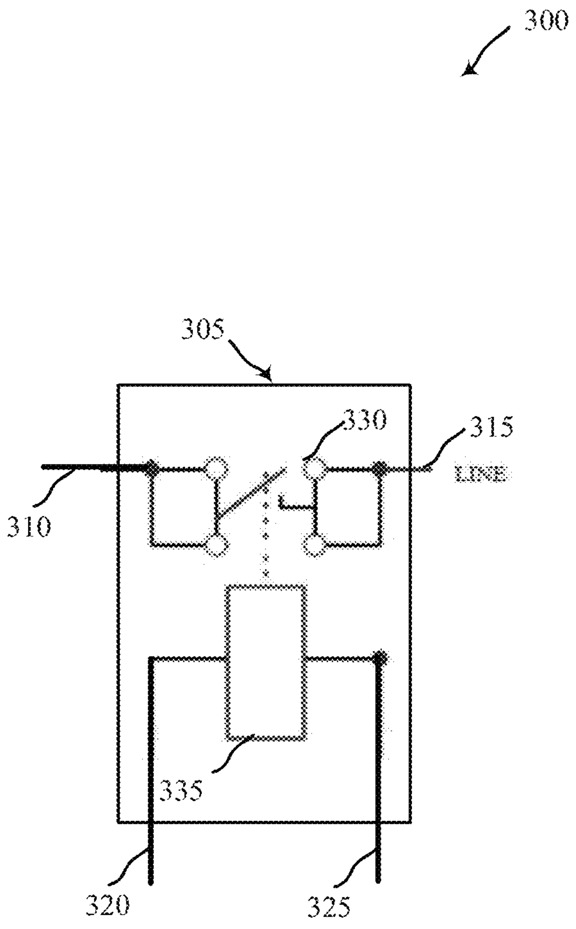
FIG. 3 is a block diagram of a relay switch in accordance with various embodiments.

Referring now to FIG. 3, a schematic representation of a relay module 300 of various embodiments is described. The relay module 300 may be an example of relay modules 230 of FIG. 2, for example. In this embodiment, a housing 305 may house the relay module 300 components. Line power 310 is provided to a relay switch 330. Line power 310 may be switched to and away from line output 315, to thereby energize and de-energize a power output coupled with the relay module 300. Relay switch 330 is controlled through a relay control 335, as is well known. Relay control may be accomplished through electrical connections 320 and 325 with the relay control 335. According to various embodiments, relay module 300 may be mounted to a printed circuit board (PCB), which may be mounted in a PDU housing or within an IPM of a PDU, for example. Such a PCB may be coupled with electrical outlets and one or more controllers, as will be readily understood by those skilled in the art.

Figure 4:
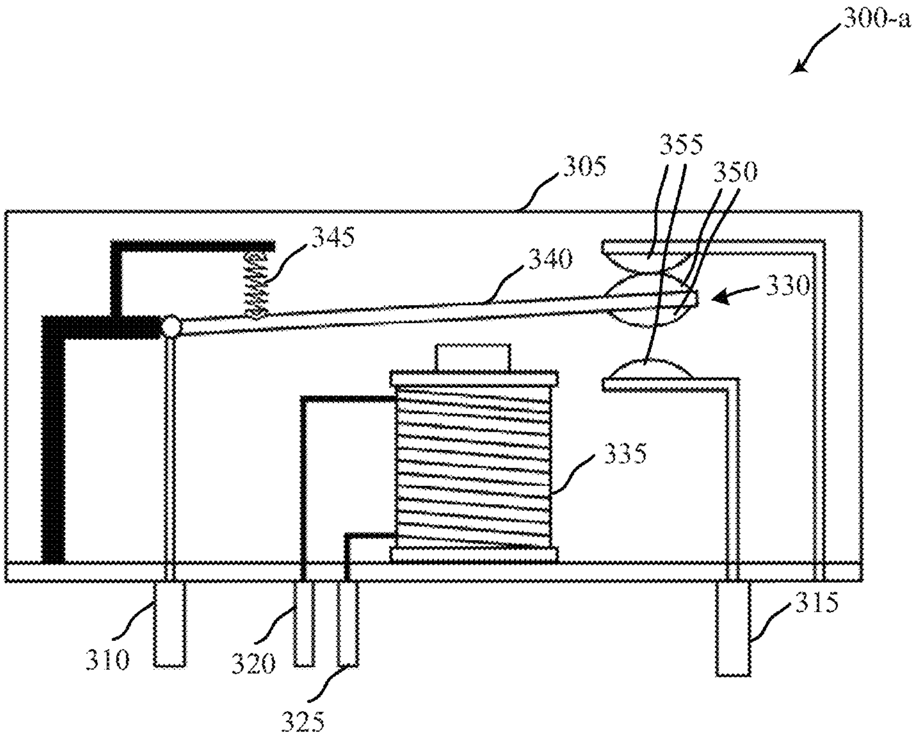
FIG. 4 shows an illustration of components in a relay switch in accordance with various embodiments.

With reference now to FIG. 4, a relay 300-*a* of some embodiments is described. In the illustration of FIG. 4, the relay 300-*a* comprises a housing 305, line power connection 310, line output 315, and relay control electrical connections 320 and 325. Within housing 305 in this embodiment is a relay switch 330, relay coil 335, and an armature 340. An armature spring 345 may be used to bias the relay module 300-*a* as a normally closed or a normally open relay. The armature 340 may include armature contacts 350 that come into contact with relay contacts 355.

As noted above, relays, such as used in relay modules 300, may have a turn on and turn off delay and in addition have natural resonances in the armature 340 and armature contacts 350 that cause the contacts 350 to bounce against relay contacts 355 for some amount of time, typically being some number of ms. During these bounces the contacts 350 move away from contacts 355. In the event that current is flowing through the armature contacts 350, an arc may develop. In some examples, an arc may develop that is on the order of 35 volts, depending on the temperature and pressure. The power dissipated during the arcing causes heating of the contacts 350, 355, and metal may sputter off of contact 350 surfaces, which may shorten the life of the contacts. According to some embodiments, a reduction in the amount of the wear on the contacts 350, 355 during turn on switching may be accomplished through a reduction of the duration of the bouncing by lowering the velocity of the armature 340 just before it makes contact with one of the relay contacts 355. The relay coil 335, according to some examples, operates to change the position of the armature 340 through magnetic fields generated from current provided to a coil. The magnetic force generated in such examples is inversely proportional to the cube of the distance to the armature 340, and the velocity of the armature 340 increases exponentially as it nears contact with contacts 355. This causes the armature 340 to be bent back due to its inertia and then, as the armature contacts 350 near contact with relay contacts 355, the armature contacts 350 and armature 340 snap forward to hit the fixed relay contact 355 with a high velocity resulting in several bounces.

In order to reduce the armature velocity just prior to the contacts closing, in some embodiments, the voltage applied to the relay control 335 may be reduced or turned off entirely for a brief period of time allowing the kinetic energy in the velocity of the armature 340 to fall as the force of the armature spring 345 exerts a retarding force on the armature 340 motion. Then, just as the armature 340 velocity drops to near zero the voltage to the relay coil 335 may be reapplied so that the armature 340 accelerates the final distance, with a reduced velocity, as it contacts relay contact 355. The reduced velocity, according to some embodiments, reduces the bouncing of the contacts 350, and may thereby provide increased lifetime for the relay module 300-*a*. In some embodiments, in order for the current of relay coil 335 to drop quickly and thereby reduce the magnetic field, a reverse voltage may be applied to connections 320, 325 to allow the current to drop to a low value in a short time. For example, some embodiments may use a relay that may switch a 120 volt power input, capable of up to 16 Amps. A typical relay in such embodiments may have voltage applied to the relay control 335 for a first time period of 1.16 ms, the voltage switched off for a second time period of 0.36 ms, and then the voltage reapplied.

According to other embodiments, relay lifetime may be enhanced through reduced contact wear by switching the relay at or near the zero crossings of the voltage or current waveform of an input AC power source. In some embodiments, contacts 350, 355 are opened just prior to the zero crossing of the current. In this manner, the duration of any arcing when the contacts 350, 355 are opened is made relatively short. The contacts 350, 355 are separated by a short distance and an arc may develop, but due to the recombination rate of the plasma of the arc at or near standard temperature and pressure, it is quickly dissipated and the resulting wear of the relay contacts 350, 355 may be reduced. In some embodiments, the timing of opening the contacts 350, 355 may be adjusted so that when small variations in timing occur, the slowest opening time with respect to the zero crossing may still occur before the zero crossing so that any arc may be dissipated before the contacts open significantly. When closing the contacts 350, 355 for power supply loads, various embodiments close the contacts 350, 355 near the zero crossing of the line voltage. This is because, according to some embodiments such as data center PDU embodiments, there are often large filter capacitors inside of power supplies associated with equipment that receive power through relays 300. If the contacts 350, 355 are closed at the peak voltage of a cycle, the large inrush currents to charge the filter capacitor may shorten the life of the contacts 350, 355. Furthermore, large inrush currents may stress components in equipment powered through the relays 300, and may introduce power line glitches due to the normal inductance and resistance of power mains.

Relays 300 have variations in normal production in their physical characteristics. Some of the parameters may include, for example, the resistance and/or inductance of the relay coil 335, mass of the armature 340, the distance between the armature 340 and the coil 335 when the relay 300 is off, the resonant frequency of the armature 340, and the force of the spring 345 that holds the armature 340 in the off position. Each of these parameters have some impact of switching time associated with a relay 300. For example, the spring 345 may have a spring force that affects the pull in time, the drop out time, the pull in current, the drop out current, and the length of the bouncing. In a product with a plurality of relays 300, according to some examples, a compensating variable may be stored in a memory that may predict the behavior of the relay 300 and hence allow the controller that switches the relay 300 on and off to vary the timing of the current to the coil 335 to cause the relay 300 to close its contacts 350, 355 at or near a zero crossing for reduced inrush current, thus prolonging the life of the contacts 350, 355. This same compensating variable may be used in a different algorithm to open the contacts 350, 355 just prior to the current decreasing to zero. In some embodiments, a processor and/or controller may monitor the current and learn over many operations the optimum timing to insure that the contacts 350, 355 open immediately prior to the current falling to zero when the contacts 350, 355 are opened. Similarly, the optimum timing may be learned for closing the contacts 350, 355 near the zero crossing to lower in the inrush current.

Figure 5:
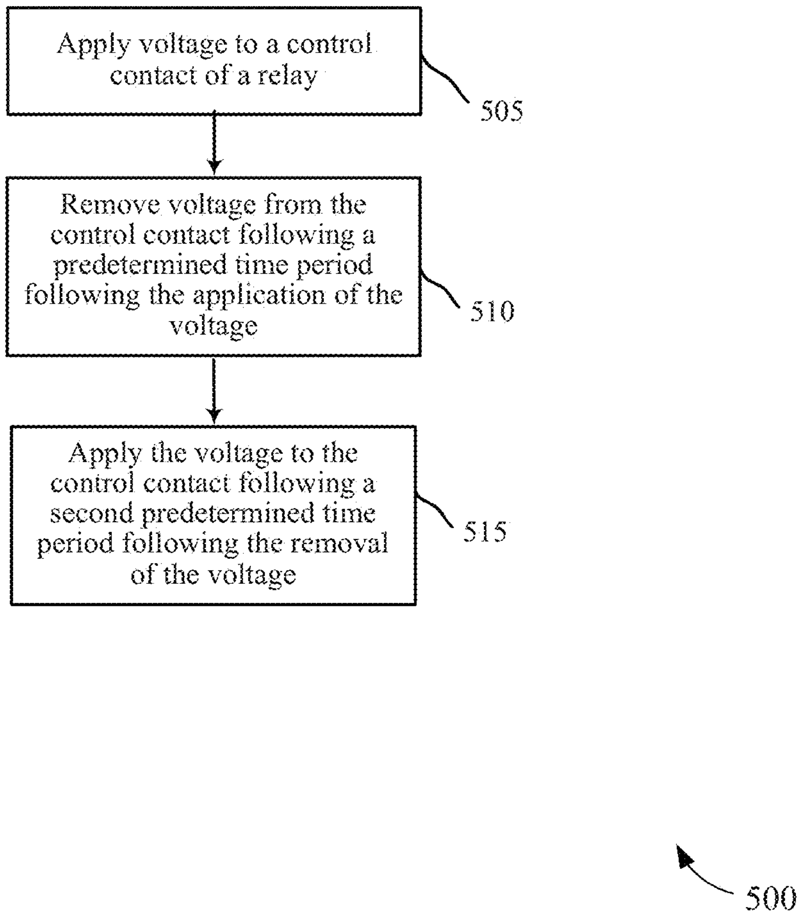
FIG. 5 shows a flow chart of a method for switching a relay switch in accordance with various embodiments.

With reference now to FIG. 5, a flow chart illustrates an embodiment of a method 500 for relay switching. For clarity, the method 500 is described with reference to a PDU device 100 or 200 of FIGS. 1 and/or 2, or with reference to a relay module of FIGS. 2-4, for example. In one implementation, a relay controller may execute one or more sets of codes to control one or more relay modules to perform the functions described below. At block 505, a relay controller applies a voltage to a control contact of a relay. At block 510, the relay controller removes voltage from the control contact following a predetermined time period following the application of the voltage. Finally, at block 515, the relay controller applies the voltage to the control contact following a second predetermined time period following the removal of the voltage.

Figure 6:
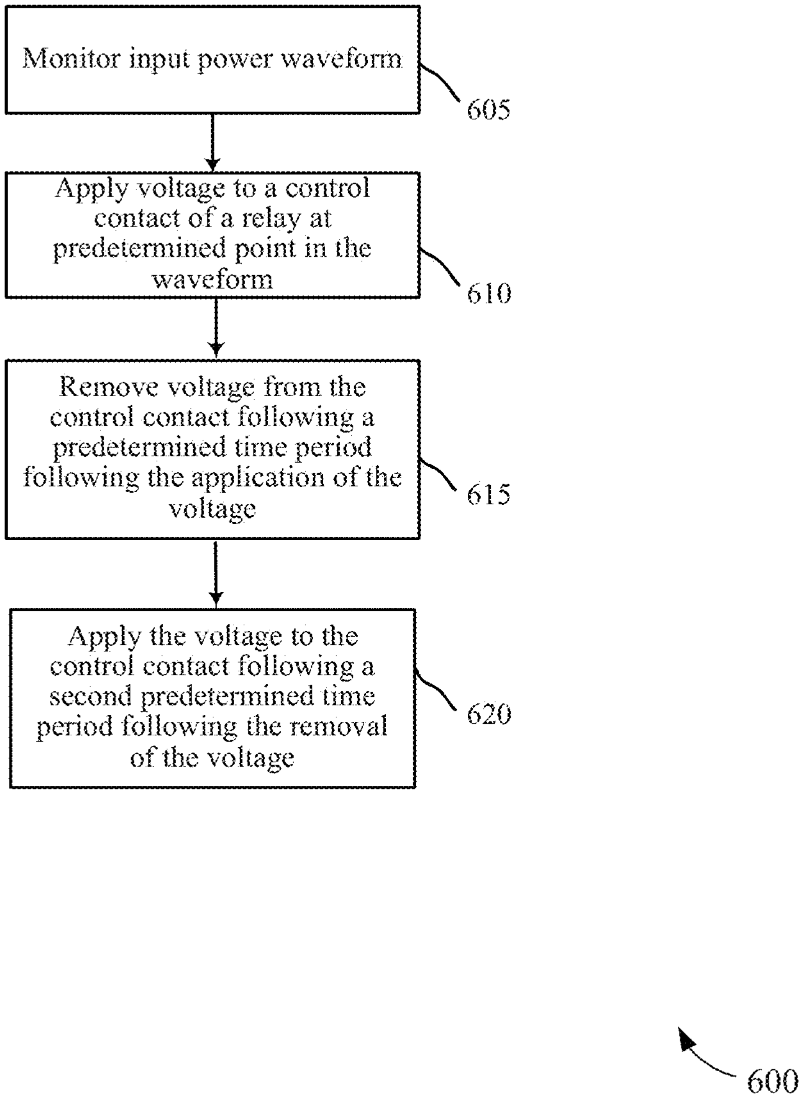
FIG. 6 shows a flow chart of another method for switching a relay switch in accordance with various embodiments.

With reference now to FIG. 6, a flow chart illustrates an embodiment of another method 600 for relay switching. For clarity, the method 600 is described with reference to a PDU device 100 or 200 of FIGS. 1 and/or 2, or with reference to a relay module of FIGS. 2-4, for example. In one implementation, a relay controller may execute one or more sets of codes to control one or more relay modules to perform the functions described below. At block 605, a relay controller or other processor associated with one or more relays monitors an input power waveform. At block 610, a voltage is applied to a control contact of a relay at a predetermined point in the waveform. At block 615, the applied voltage is removed from the control contact following a predetermined time period following the application of the voltage. Finally, at block 620, a voltage is again applied to the control contact following a second predetermined time period following the removal of the voltage.

Figure 7:
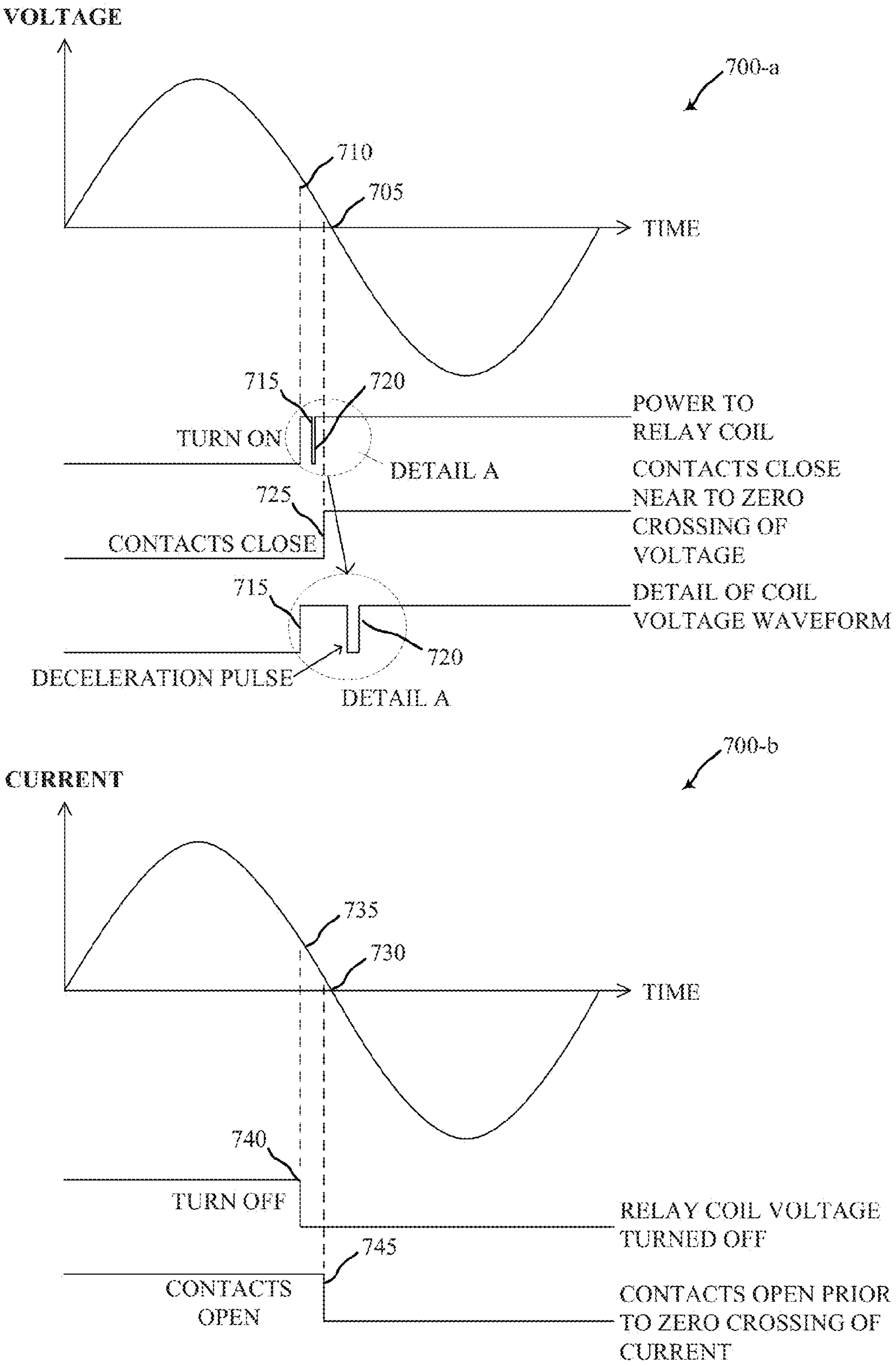
FIG. 7 shows a timing diagram for exemplary relay switching in accordance with various embodiments.

Referring next to FIG. 7, exemplary timing diagrams are illustrated for various embodiments. In the example of FIG. 7, an AC current waveform 700-*a* and an AC voltage waveform 700-*b* are illustrated. As discussed above, according to various embodiments a relay may be configured to switch at or near a zero-crossing of the current or voltage waveforms. In some embodiments, when closing the contacts for power supply loads, as mentioned above, the contacts may close near the zero crossing 705 of the line voltage waveform 700-*a*. When referring to closing of the contacts near to the zero crossing of voltage, reference is made to switching slightly before, at, or slightly after the zero crossing. According to embodiments, power to the coil relay may be turned on or off several milliseconds before the zero crossing to achieve switching near the zero-crossing. As illustrated in FIG. 7, at a relatively short time prior to the zero crossing 705, indicated at 710, power may be applied to the relay coil, as indicated at 715. In order to reduce armature velocity, a deceleration pulse 720 is applied to the power to the relay coil, as indicated at detail A. The deceleration pulse 720 may be achieved, in some embodiments, by reducing, or turning off entirely, the power to the relay coil for a brief period of time allowing the kinetic energy in the velocity of the armature to fall as the force of the armature spring exerts a retarding force on the armature motion, similarly as discussed above with respect to FIG. 4. When the armature velocity is reduced, the power may be reapplied so that the armature accelerates the final distance, with a reduced velocity, as it contacts relay contact, and the contacts are closed, as indicated at 725.

As also discussed above, in some embodiments relay contacts may be opened just prior to the zero crossing 730 of the current waveform 700-*b*. In this manner, the duration of any arcing when the contacts are opened is made relatively short. In some embodiments, power to the relay coil may be removed at time 735 prior to the zero crossing 730 of the current waveform 700-*b*. This may be accomplished by removing voltage from the relay coil, as indicated at 740. The contacts of the relay then open at 745. The timing of opening the contacts may be adjusted so that when small variations in timing occur, the slowest opening time with respect to the zero crossing 730 may still occur before the zero crossing 730, so that any arc may be extinguished by the current decreasing to zero before the contacts open significantly. Such reduced arcing may enhance relay lifetime, as discussed above.

It should be noted that the systems and devices discussed above are intended merely to be examples. It must be stressed that various embodiments may omit, substitute, or add various procedures or components as appropriate. For instance, it should be appreciated that, in alternative embodiments, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, structures, and techniques have been shown without unnecessary detail in order to avoid obscuring the embodiments.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A power control relay apparatus, comprising:

a relay housing comprising a power input, a control input, a power output, and a relay switch, the relay switch coupled with the power input, control input, and power output and configured to interrupt power from the power input to the power output in response to the control input;

a sensor coupled with the power input configured to output a signal representative of a sensed parameter of an input power source; and a relay controller coupled with the control input and the sensor, and configured to control one or more of a time for switching the relay switch based on the sensed parameter or a velocity of an armature of the relay switch during switching, wherein the relay switch comprises the armature and a spring coupled with the armature configured to bias the armature in an open position when the relay switch is open, and wherein the relay controller is further configured to switch the relay switch based on the sensed parameter and a biasing force provided by the spring.

2. The apparatus of claim 1, wherein the input power source provides alternating current (AC) power and the sensed parameter comprises a voltage or current level of the AC power, and wherein the relay controller is configured to switch the relay switch based on a time at which the voltage or current of the power input is at a zero-crossing.

3. The apparatus of claim 2, wherein the relay controller is configured to close the relay switch based on when a voltage of the power input is at a zero-crossing.

4. The apparatus of claim 2, wherein the relay controller is configured to open the relay switch based on when a voltage of the power input is at a zero-crossing.

5. The apparatus of claim 1, wherein the relay controller is configured to control two or more relay switches each having a different biasing force.

6. The apparatus of claim 5, further comprising a memory coupled with the relay controller and configured to store a compensating variable for each of the relay switches, and wherein the relay controller is configured to switch each respective relay switch based on the sensed parameter and associated compensating variable.

7. The apparatus of claim 6, wherein the relay controller is further configured to modify one or more of the compensating variables based on switching response times of the associated relay switch.

8. The apparatus of claim 1, wherein the relay controller is configured to apply a switching voltage to the relay switch for a first time period, remove the switching voltage for a second time period, and apply the switching voltage for a third time period.

9. The apparatus of claim 8, wherein the first time period corresponds to a subset of the time period required for switching of the relay switch, and the second time period corresponds to a time period immediately preceding contact of a relay contact with an armature contact.

10. A power distribution apparatus, comprising:

a housing having a power input and a sensor coupled with the power input that is configured to output a signal representative of a sensed parameter of an input power source;

a plurality of power outputs disposed in the housing, each connectable in power supply communication with the power input and at least one electronic appliance;

at least one power control relay coupled with one or more of the plurality of power outputs, the power control relay comprising a relay housing that comprises a switching element; and a relay controller coupled with the at least one power control relay and the sensor, and configured to control one or more of a time for switching the power control relay based on the sensed parameter or a velocity of an armature of the power control relay during switching, wherein the power control relay comprises the armature and a spring coupled with the armature configured to bias the armature in an open position when the relay is open, and wherein the relay controller is further configured to switch the relay based on the sensed parameter and a biasing force provided by the spring.

11. The apparatus of claim 10, wherein the sensed parameter comprises a voltage or current level of an alternating current power source, and wherein the relay controller is configured to switch the power control relay based on a time at which the voltage or current of the power source is at a zero-crossing.

12. The apparatus of claim 10, wherein the relay controller is configured to control two or more relay each having a different biasing force, and wherein the relay controller is configured to switch each respective relay based on the sensed parameter and an associated compensating variable associated with each relay.

13. The apparatus of claim 10, wherein the relay controller is configured to apply a switching voltage to the relay for a first time period, removing the switching voltage for a second time period, and apply the switching voltage for a third time period.

14. The apparatus of claim 13, wherein the first time period corresponds to a subset of the time period required for switching of the relay, and the second time period corresponds to a time period immediately preceding contact of a relay contact with an armature contact.

15. A power distribution apparatus, comprising:

a housing having a power input and a sensor coupled with the power input that is configured to output a signal representative of a sensed parameter of an input power source;

a plurality of power outputs disposed in the housing, each connectable in power supply communication with the power input and at least one electronic appliance;

a plurality of power control relays each coupled with a respective power output, each power control relay comprising a relay housing that comprises a switching element; and a relay controller coupled with the power control relays and the sensor, and configured to control one or more of a time for switching each power control relay based on the sensed parameter or a velocity of an armature of the associated power control relay during switching, wherein each power control relay comprises the armature and a spring coupled with the armature configured to bias the armature in an open position when the relay is open, and wherein the relay controller is further configured to switch each relay based on the sensed parameter and a biasing force provided by the spring.

16. The apparatus of claim 15, wherein the sensed parameter comprises a voltage or current level of an alternating current power source, and wherein the relay controller is configured to switch each power control relay based on a time at which the voltage or current of the power source is at a zero-crossing.

17. The apparatus of claim 15, further comprising a memory coupled with the relay controller configured to store a compensating variable for each of the relays; and wherein each relay has a different biasing force, and the compensating variable for each relay is based on the biasing force of the respective relay, and wherein, the relay controller is configured to switch each respective relay based on the sensed parameter and an associated compensating variable associated with each relay.

18. The apparatus of claim 17, wherein the relay controller is further configured to modify one or more of the compensating variables based on switching response times of the associated relay.

19. The apparatus of claim 15, wherein the relay controller is configured to apply a switching voltage to the relay for a first time period, remove the switching voltage for a second time period, and apply the switching voltage for a third time period.

20. The apparatus of claim 19, wherein the first time period corresponds to a subset of the time period required for switching of the relay, and the second time period corresponds to a time period immediately preceding contact of a relay contact with an armature contact.

21. A power control relay apparatus, comprising:

a relay housing comprising a power input, a control input, a power output, and a relay switch, the relay switch coupled with the power input, control input, and power output and configured to interrupt power from the power input to the power output in response to the control input;

a sensor coupled with the power input configured to output a signal representative of a sensed parameter of an input power source; and a relay controller coupled with the control input and the sensor, and configured to control a velocity of an armature of the relay switch during switching, wherein the relay switch comprises the armature and a spring coupled with the armature configured to bias the armature in an open position when the relay switch is open, and wherein the relay controller is further configured to switch the relay switch based on the sensed parameter and a biasing force provided by the spring.

22. The apparatus of claim 21, wherein the relay controller is configured to control two or more relay switches each having a different biasing force.

23. The apparatus of claim 22, further comprising a memory coupled with the relay controller and configured to store a compensating variable for each of the relay switches, and wherein the relay controller is configured to switch each respective relay switch based on the sensed parameter and associated compensating variable.

24. The apparatus of claim 23, wherein the relay controller is further configured to modify one or more of the compensating variables based on switching response times of the associated relay switch.

25. The apparatus of claim 21, wherein the relay controller is configured to apply a switching voltage to the relay switch for a first time period, remove the switching voltage for a second time period, and apply the switching voltage for a third time period, wherein the first time period corresponds to a subset of the time period required for switching of the relay switch, and the second time period corresponds to a time period immediately preceding contact of a relay contact with an armature contact.

26. A power distribution apparatus, comprising:

a housing having a power input and a sensor coupled with the power input that is configured to output a signal representative of a sensed parameter of an input power source;

a plurality of power outputs disposed in the housing, each connectable in power supply communication with the power input and at least one electronic appliance;

at least one power control relay coupled with one or more of the plurality of power outputs, the power control relay comprising a relay housing that comprises a switching element; and a relay controller coupled with the at least one power control relay and the sensor, and configured to control a velocity of an armature of the power control relay during switching, wherein the power control relay comprises the armature and a spring coupled with the armature configured to bias the armature in an open position when the relay is open, and wherein the relay controller is further configured to switch the relay based on the sensed parameter and a biasing force provided by the spring.

27. The apparatus of claim 26, wherein the relay controller is configured to control two or more relay each having a different biasing force, and wherein the relay controller is configured to switch each respective relay based on the sensed parameter and an associated compensating variable associated with each relay.

28. The apparatus of claim 26, wherein the relay controller is configured to apply a switching voltage to the relay for a first time period, removing the switching voltage for a second time period, and apply the switching voltage for a third time period, wherein the first time period corresponds to a subset of the time period required for switching of the relay, and the second time period corresponds to a time period immediately preceding contact of a relay contact with an armature contact.

29. A power distribution apparatus, comprising:

a housing having a power input and a sensor coupled with the power input that is configured to output a signal representative of a sensed parameter of an input power source;

a plurality of power outputs disposed in the housing, each connectable in power supply communication with the power input and at least one electronic appliance;

a plurality of power control relays each coupled with a respective power output, each power control relay comprising a relay housing that comprises a switching element; and a relay controller coupled with the power control relays and the sensor, and configured to control a velocity of an armature of the associated power control relay during switching, wherein each power control relay comprises the armature and a spring coupled with the armature configured to bias the armature in an open position when the relay is open, and wherein the relay controller is further configured to switch each relay based on the sensed parameter and a biasing force provided by the spring.

30. The apparatus of claim 29, further comprising a memory coupled with the relay controller configured to store a compensating variable for each of the relays; and wherein each relay has a different biasing force, and the compensating variable for each relay is based on the biasing force of the respective relay, and wherein, the relay controller is configured to switch each respective relay based on the sensed parameter and an associated compensating variable associated with each relay.

31. The apparatus of claim 30, wherein the relay controller is further configured to modify one or more of the compensating variables based on switching response times of the associated relay.

32. The apparatus of claim 29, wherein the relay controller is configured to apply a switching voltage to the relay for a first time period, remove the switching voltage for a second time period, and apply the switching voltage for a third time period, wherein the first time period corresponds to a subset of the time period required for switching of the relay, and the second time period corresponds to a time period immediately preceding contact of a relay contact with an armature contact.

* * * * *